US00RE34193E

United States Patent [19]

Carey

[11] E Patent Number: Re. 34,193

[45] Reissued Date of Patent: Mar. 9, 1993

[54] [SNACK BAG] *BAG FOR OBJECTS SUCH AS SNACKS*

[76] Inventor: Robert J. Carey, P.O. Box 403, Middletown, N.J. 07748

[21] Appl. No.: 656,516

[22] Filed: Feb. 19, 1991

Related U.S. Patent Documents

Reissue of:

[64] Patent No.: 4,950,087
Issued: Aug. 21, 1990
Appl. No.: 469,362
Filed: Jan. 24, 1990

[51] Int. Cl.[5] ..... B65D 33/24; B65D 43/04

[52] U.S. Cl. ..... 383/43; 383/93; 383/94; 383/95; 229/125.17; 229/125.32

[58] Field of Search ..... 383/28, 29, 43, 78, 383/80, 81, 93, 95, 94, 42, 111; 229/125.17, 125.32, 125.02, 125.33

[56] References Cited

U.S. PATENT DOCUMENTS

| | | | |
|---|---|---|---|
| 1,981,711 | 11/1934 | Russell | 383/87 X |
| 2,693,836 | 11/1954 | Hayes | 383/29 |
| 2,970,736 | 2/1961 | Baughan | 206/631 X |
| 3,317,109 | 5/1967 | Palmer | 229/125.17 X |
| 3,520,470 | 7/1970 | Korn et al. | 383/28 X |
| 3,877,352 | 4/1975 | Brieske | 383/28 X |
| 3,977,596 | 8/1976 | Gamble | 383/95 X |
| 4,700,883 | 10/1987 | Vajtay | 229/125.17 |
| 4,716,947 | 1/1988 | Haddock | 383/111 X |
| 4,819,793 | 4/1989 | Willard et al. | 383/38 X |

FOREIGN PATENT DOCUMENTS

| | | | |
|---|---|---|---|
| 20067 | 5/1905 | Austria | 383/43 |
| 99129 | 9/1964 | Denmark | 383/78 |
| 168908 | 5/1906 | Fed. Rep. of Germany | 383/43 |
| 219 | of 1884 | United Kingdom | 383/43 |
| 827281 | 2/1960 | United Kingdom | 229/125.32 |
| 1022595 | 3/1966 | United Kingdom | 383/28 |

*Primary Examiner*—Stephen Marcus
*Assistant Examiner*—Jes F. Pascua
*Attorney, Agent, or Firm*—R. Gale Rhodes, Jr.

[57] ABSTRACT

A [snack] bag, *such as for example for snacks,* including a bag within a bag wherein the inside bag is inverted with its ends opposed to and portions thereof secured to the opposed ends of the outside bag, with the sides of the inside bag being opposed to, and in substantial engagement with, but not secured to, the sides of the outside bag to provide a substantially air tight seal therebetween, and with the bottom of the inverted inside bag being spaced from the bottom of the outside bag to provide [a snack] *an object* receiving container comprised of the opposed bottoms, sides and ends of the inside bag and portions of the sides and ends of the outside bag. Access to the *objects such as* snacks is readily provided by permitting the hand of a person to be readily inserted between opposed sides of the bags which sides, after the hand is withdrawn with the *objects such as* snacks therein, return to substantial air tight engagement maintaining the remaining *objects such as* snacks in a substantially air tight manner.

3 Claims, 2 Drawing Sheets

[SNACK BAG] *BAG FOR OBJECTS SUCH AS SNACKS*

Matter enclosed in heavy brackets [ ] appears in the original patent but forms no part of this reissue specification; matter printed in italics indicates the additions made by reissue.

BACKGROUND OF THE INVENTION

This invention relates to a new and improved snack bag for containing *objects such as* snacks [such as] *e.g.* popcorn, potato chips, corn chips, pretzels, and the like, and for containing such [snacks] *objects* in a substantially air tight manner while yet permitting ready access thereto by the hand of a person desiring *for example* to each such snacks.

Snacks of the type noted above are typically bought residing within a sealed plastic bag or within a sealed plastic bag residing within a cardboard box. Access to the snacks for eating is obtained by tearing or unsealing the plastic bag and the problem well known is that it is ofttimes unwantedly difficult or cumbersome to reclose the bag to prevent air from reaching and spoiling the remaining snacks after a portion has been eaten.

Accordingly, there exists a need in the art for a new and improved *bag such as a* snack bag into which snacks, *for example,* may be placed, particularly after a portion has been eaten, and which bag which provides ready access to the snacks for eating and which reseals or closes readily maintaining the enclosed snacks in a substantially air tight manner.

SUMMARY OF THE INVENTION

It is the object of this invention to satisfy the foregoing need in the [snack or] *bag art particularly the* snack bag art.

A *bag, for example a* snack bag satisfying such need and embodying the present invention may include a bag within a bag wherein the inside bag is inverted with its ends opposed to and portions thereof secured to the opposed ends of the outside bag, with the sides of the inside bag being opposed to and in substantial engagement with, but not secured to, the sides of the outside bag to provide a substantially air tight seal therebetween, and with the bottom of the inverted inside bag being spaced from the bottom of the outside bag to provide a snack receiving container comprised of the opposed bottoms, sides and ends of the inside bag and portions of the sides and ends of the outside bag. Access to the snacks is readily provided by permitting, for example, the hand of a person to be readily inserted between opposed sides of the bags which sides, after the hand is withdrawn with the snacks therein, return to substantial engagement maintaining the remaining snacks in a substantially air tight seal.

DESCRIPTION OF THE PREFERRED EMBODIMENT

Figure 1:
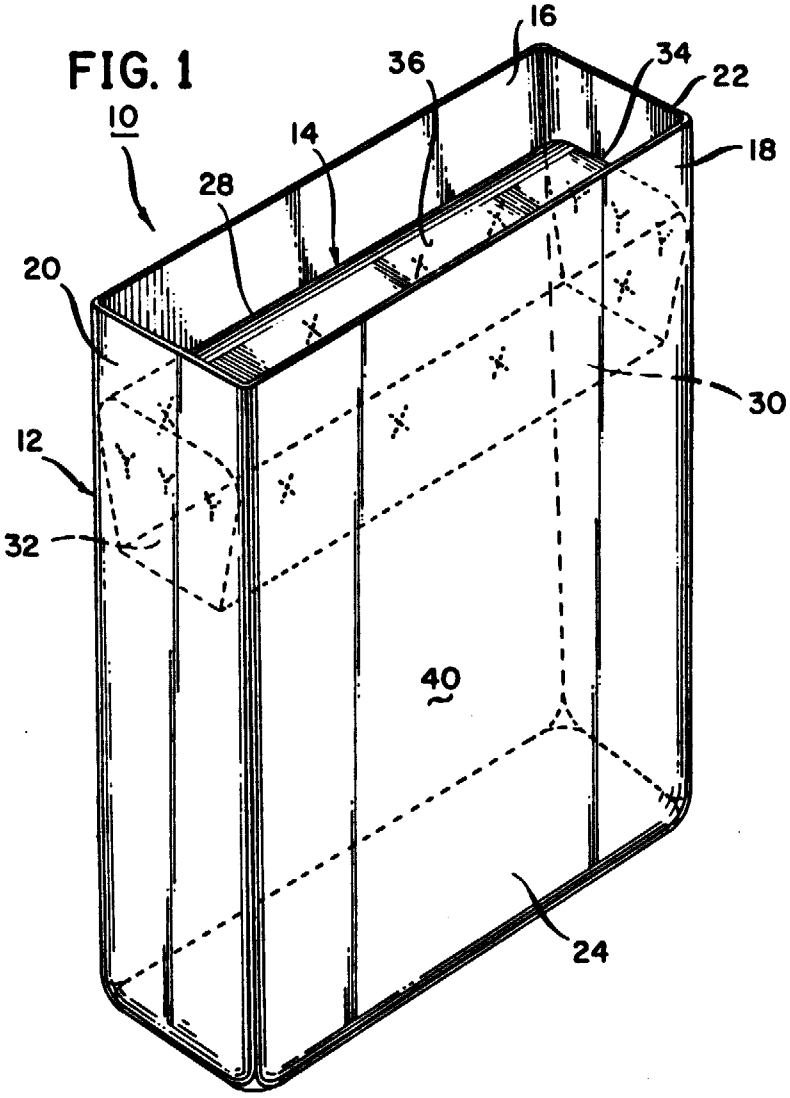
FIG. 1 is a diagrammatical illustration, in perspective, of a *bag, e.g. a* snack bag embodying the present invention.
Figure 3:
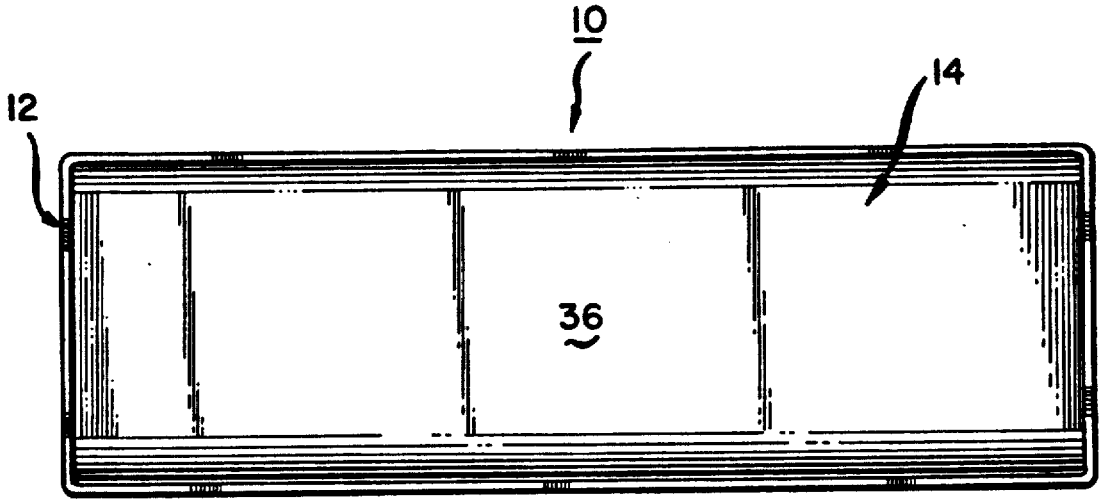
FIGS. 3 and 4 are top views of the *bag, e.g.* snack bag of the present invention with FIG. 3 showing the bag in the closed position and with FIG. 4 showing the bag in the open position.

Referring now to FIG. 1, there is illustrated a *bag, e.g.* snack bag satisfying the foregoing need in the art, embodying the present invention, and indicated by general numerical designation 10. Snack bag 10 includes an outer bag indicated by general numerical designation 12 and an inner bag indicated by general numerical designation 14 with the inner bag being inverted and residing interiorly of the outer bag.

The outer bag 12 includes opposed sides 16 and 18, opposed ends 20 and 22, and a bottom 24. The inner bag 14 includes opposed sides 28 and 30, opposed ends 32 and 34, and a bottom 36.

It will be understood that the opposed ends 32 and 34 of the inner bag 14 are opposite, and at least portions thereof indicated at Y-Y-Y are secured, such as by suitable adhesive or by heat sealing, to portions of the opposed ends 20 and 22 of the outer bag 10. However, it will be expressly understood that the opposed sides 28 and 30 of the inner bag 14 are opposite and in substantial engagement with, but not secured to, the opposed sides 16 and 18 of the outer bag 10 along the area indicated generally X-X-X; it will be understood that the engagement between the opposed sides 28 and 30 of the inner bag 14 with the opposed sides 16 and 18 of the outer bag 12 along the lines X-X-X provides a substantially air tight seal therebetween. Thus, it will be further understood that the opposed sides 28 and 30, opposed ends 32 and 34, and bottom 36 of the inner bag 14, and portions of the opposed sides 16 and 18 and portions of the opposed ends 20 and 22 and the bottom 24 of the outer bag 12 provide, in combination, an inner chamber indicated by general numerical designation 40 for containing *objects such as* snacks such as indicated diagrammatically by the irregular closed lines identified by numerical designations 44 in FIG. 2.

Figure 2:
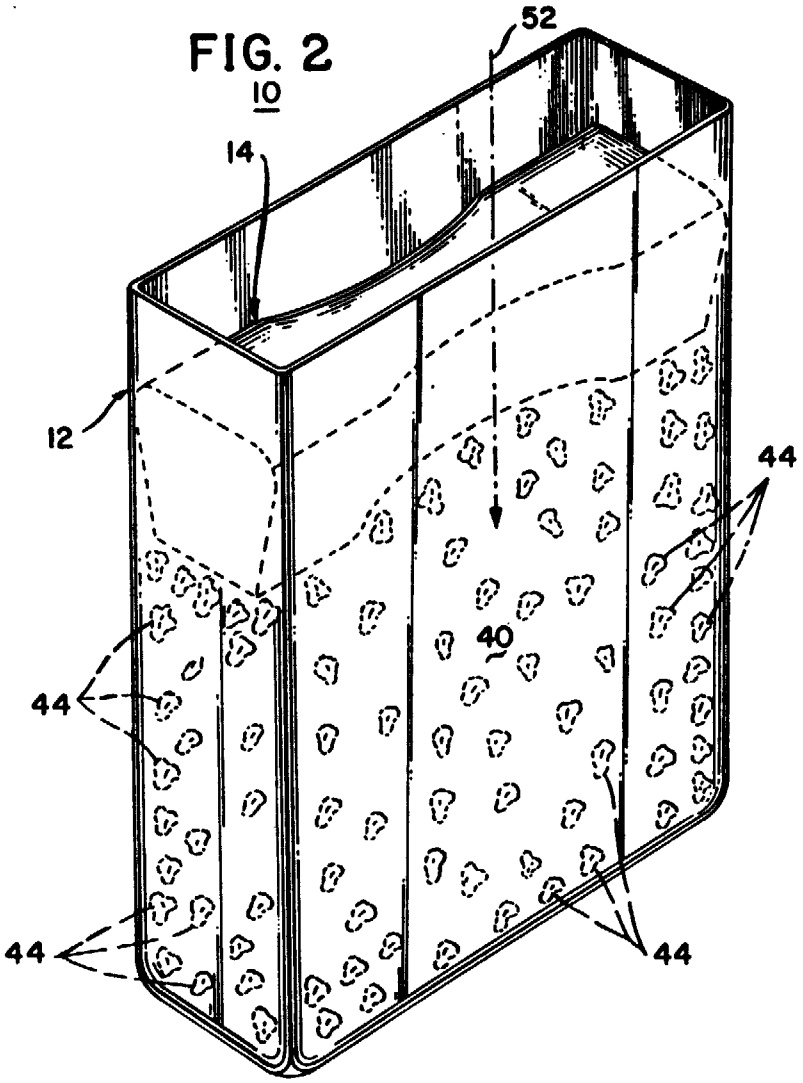
FIG. 2 is a diagramatical illustration similar to FIG. 1 but illustrating, diagrammatically, snacks contained within the [snack] bag and the manner of access thereto.
Figure 4:
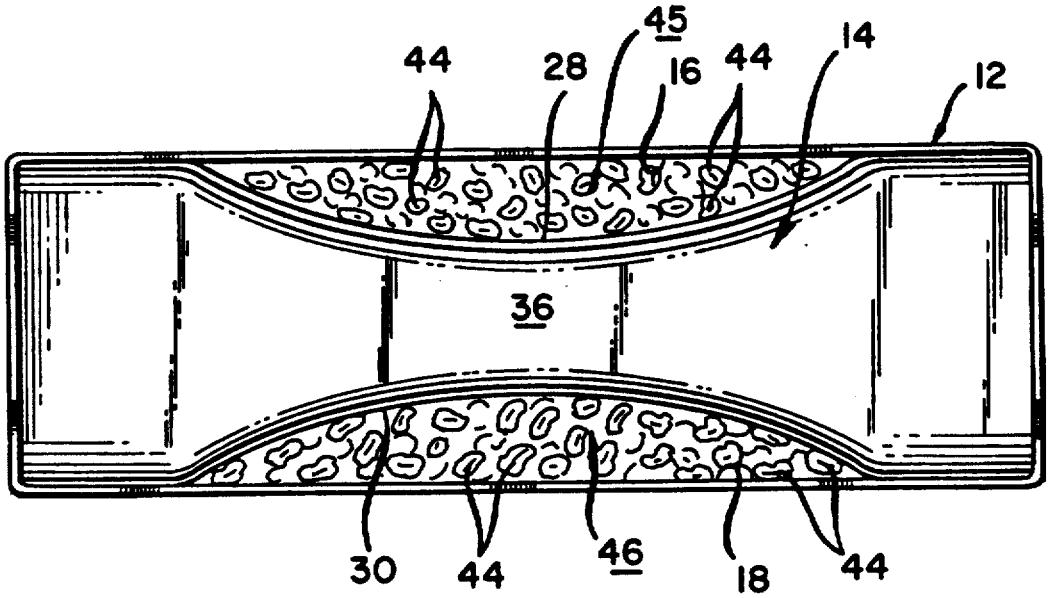

Access to the *objects such as* snacks 44, FIG. 2, such as by the hand of the person desiring to eat the *objects such as* snacks, may be readily obtained by inserting the hand downwardly along the line indicated by the dashed arrow 52 whereby the hand will separate the side 30 (FIG. 1) of the inner bag 14 from the side 18 (FIG. 1) of the outer bag 12, providing the opening indicated by general numerical designation 46 in FIG. 4, permitting the inserted hand to grasp and remove snacks 44 through the opening 46 (FIG. 4). Thereafter, upon the removal of the hand, the side 30 of the inner bag 14 will return to a substantial air tight engagement with the side 18 of the outer bag 12 to provide a substantially air tight seal therebetween.

It will be understood that the expression "substantially air tight seal" as used herein and in the appended claim is used in the context of substantially preventing the passage of air between, for example, the side 30 of the inner bag 14 and the side 18 of the outer bag 12 recognizing, however, that some small amount of air may pass therebetween. Such small amount of air will not substantially spoil [the] *objects such as* snacks 44 within the bag 10 and such "substantially air tight seal" will greatly reduce [snack] spoilage *of objects such as snacks* beyond that which would be experienced were the snacks 44, *for example,* to be completely exposed to surrounding air.

As may be further understood from FIG. 4, an opening indicated by general numerical designation 45 may also be formed by the hand of a person being inserted between the side 28 (FIG. 1) of the inner bag 14 and the side 16 (FIG. 1) of the outer bag 12 to provide access to snacks 44 (FIG. 2).

The bag 10, bags 12 and 14, may be made preferably from a suitable plastic material such as a suitable thermoplastic material of the type known to the art. *Alternative to the snacks 44, the bag 10 of the present invention may contain many other objects.*

It will be understood that many variations and modifications may be made in the present invention without departing from the spirit and the scope thereof.

What is claimed is:

1. Bag for containing snacks, comprising:

an outer bag including opposed sides, opposed ends, a bottom and an open top;

an inner bag including opposed sides, opposed ends, a bottom and an open top;

said inner bag being inverted and residing in said outer bag at a predetermined distance between the top and bottom of said outer bag, with said ends of said inner bag being opposed to and at least portions thereof secured to said opposed ends of said outer bag, with said opposed sides of said inner bag being opposite said opposed sides of said outer bag and being in substantial engagement therewith but not secured thereto to provide a substantially air tight seal therebetween, and with said bottom of said inner bag being opposite said bottom of said outer bag, said bottoms, said opposed sides and ends of said inner bag and portions of said opposed ends and sides of said outer bag providing in combination a chamber for receiving said snacks; and access to snacks contained in said chamber being provided by physically separating said opposed sides of said outer and inner bags.

*2. Bag for containing snacks, comprising:*

*a first bag including opposed sides, opposed ends, a bottom and an open top;*

*a second bag including opposed sides, opposed ends, a bottom and an open top;*

*said second bag being inverted and at least portions thereof residing in said first bag with at least portions of said ends of said second bag being opposed to and secured to said ends of said first bag, with at least portions of said sides of said second bag being opposite at least portions of said sides of said first bag and being in substantial engagement therewith but not secured thereto to provide a substantially air-tight seal therebetween, and with said bottom of said second bag being opposite said bottom of said first bag, said bottoms, said sides and said ends of said second bag and portions of said ends of said sides of said first bag providing in combination a chamber for receiving said snacks; and*

*access to said snacks contained in said chamber being provided by physically separating said opposed portions of said sides of said first and second bags.*

*3. Bag for containing objects, comprising:*

*a first bag including opposed sides, opposed ends, a bottom and an open top;*

*a second bag including opposed sides, opposed ends, a bottom and an open top;*

*said second bag being inverted and at least portions thereof residing in said first bag with at least portions of said ends of said second bag being opposed to and secured to said ends of said first bag, with at least portions of said sides of said second bag being opposite at least portions of said sides of said first bag and being in substantial engagement therewith but not secured thereto to provide a substantially air-tight seal therebetween, and with said bottom of said second bag being opposite said bottom of said first bag, said bottoms, said sides and said ends of said second bag and portions of said ends and portions of said sides of said first bag providing in combination a chamber for receiving said objects; and*

*access to said objects contained in said chamber being provided by physically separating said opposed portions of said sides of said first and second bags.*

* * * * *